(12) United States Patent
Hepworth et al.

(10) Patent No.: US 8,218,751 B2
(45) Date of Patent: Jul. 10, 2012

(54) METHOD AND APPARATUS FOR IDENTIFYING AND ELIMINATING THE SOURCE OF BACKGROUND NOISE IN MULTI-PARTY TELECONFERENCES

(75) Inventors: Neil Hepworth, San Francisco, CA (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 837 days.

(21) Appl. No.: 12/240,119

(22) Filed: Sep. 29, 2008

(65) Prior Publication Data
US 2010/0080374 A1 Apr. 1, 2010

(51) Int. Cl.
*H04M 3/56* (2006.01)
(52) U.S. Cl. ............ 379/204.01; 379/202.01; 370/260; 455/416
(58) Field of Classification Search ............ 379/202.01, 379/204.01; 370/259–271; 455/416; 348/14.08, 348/14.09
See application file for complete search history.

(56) References Cited

U.S. PATENT DOCUMENTS

| | | |
|---|---|---|
| 4,791,660 A | 12/1988 | Oye et al. |
| 5,067,127 A | 11/1991 | Ochiai |
| 5,206,903 A | 4/1993 | Kohler et al. |
| 5,506,872 A | 4/1996 | Mohler |
| 5,594,740 A | 1/1997 | LaDue |
| 5,604,786 A | 2/1997 | Engelke et al. |
| 5,724,405 A | 3/1998 | Engelke et al. |
| 5,724,416 A | 3/1998 | Foladare et al. |
| 5,802,058 A | 9/1998 | Harris et al. |
| 5,828,747 A | 10/1998 | Fisher et al. |
| 5,878,029 A | 3/1999 | Hasegawa et al. |
| 5,905,793 A | 5/1999 | Flockhart et al. |
| 5,933,425 A | 8/1999 | Iwata |
| 5,946,618 A | 8/1999 | Agre et al. |
| 5,953,312 A | 9/1999 | Crawley et al. |
| 5,961,572 A | 10/1999 | Craport et al. |

(Continued)

FOREIGN PATENT DOCUMENTS

CA 2319655 6/2001

(Continued)

OTHER PUBLICATIONS

U.S. Appl. No. 12/748,094, filed Mar. 26, 2010, Gentle et al.

(Continued)

*Primary Examiner* — Ahmad Matar
*Assistant Examiner* — Oleg Asanbayev
(74) *Attorney, Agent, or Firm* — Sheridan Ross P.C.

(57) ABSTRACT

A mechanism is provided that allows participants on the conference call to identify, and then mute or filter, a participant(s) responsible for introducing the noise, regardless of whether the noise is caused by transmission impairments or by the participant(s) being in a noisy location. For example, individual users could be able to press a "test" button that could block each of the participants one at a time. This would allow the source of the noise to be identified. This "test button" could be one or more of provided at the endpoint(s), be enabled through a web interface or, for example, through a dedicated conference call interface at the endpoint(s) or at the conference bridge. The blocking of each participant could occur through interaction with the main PBX using, for example, in-band signaling to the PBX. Once the source(s) of the noise is identified, noise mitigation can be applied as needed.

18 Claims, 3 Drawing Sheets

U.S. PATENT DOCUMENTS

| | | |
|---|---|---|
| 5,982,873 A | 11/1999 | Flockhart et al. |
| 6,002,933 A | 12/1999 | Bender et al. |
| 6,021,178 A | 2/2000 | Locke et al. |
| 6,038,214 A | 3/2000 | Shionozaki |
| 6,058,163 A | 5/2000 | Pattison et al. |
| 6,061,431 A | 5/2000 | Knappe et al. |
| 6,067,300 A | 5/2000 | Baumert et al. |
| 6,073,013 A | 6/2000 | Agre et al. |
| 6,088,732 A | 7/2000 | Smith et al. |
| 6,122,665 A | 9/2000 | Bar et al. |
| 6,163,607 A | 12/2000 | Bogart et al. |
| 6,173,053 B1 | 1/2001 | Bogart et al. |
| 6,185,527 B1 | 2/2001 | Petkovic et al. |
| 6,192,122 B1 | 2/2001 | Flockhart et al. |
| 6,212,275 B1 | 4/2001 | Akhteruzzaman |
| 6,249,757 B1 | 6/2001 | Cason |
| 6,256,300 B1 | 7/2001 | Ahmed et al. |
| 6,349,136 B1 | 2/2002 | Light et al. |
| 6,374,302 B1 | 4/2002 | Galasso et al. |
| 6,381,472 B1 | 4/2002 | LaMedica, Jr. et al. |
| 6,381,639 B1 | 4/2002 | Thebaut et al. |
| 6,421,425 B1 | 7/2002 | Bossi et al. |
| 6,434,628 B1 | 8/2002 | Bowman-Amuah |
| 6,453,022 B1 | 9/2002 | Weinman, Jr. |
| 6,463,470 B1 | 10/2002 | Mohaban et al. |
| 6,463,474 B1 | 10/2002 | Fuh et al. |
| 6,469,991 B1 | 10/2002 | Chuah |
| 6,490,343 B2 | 12/2002 | Smith, Jr. et al. |
| 6,490,556 B1 | 12/2002 | Graumann et al. |
| 6,498,791 B2 | 12/2002 | Pickett et al. |
| 6,502,131 B1 | 12/2002 | Vaid et al. |
| 6,526,140 B1 | 2/2003 | Marchok et al. |
| 6,529,475 B1 | 3/2003 | Wan et al. |
| 6,529,499 B1 | 3/2003 | Doshi et al. |
| 6,532,241 B1 | 3/2003 | Ferguson et al. |
| 6,546,082 B1 | 4/2003 | Alcendor et al. |
| 6,563,794 B1 | 5/2003 | Takashima et al. |
| 6,578,077 B1 | 6/2003 | Rakoshitz et al. |
| 6,601,101 B1 | 7/2003 | Lee et al. |
| 6,618,368 B1 | 9/2003 | Tanigawa et al. |
| 6,628,611 B1 | 9/2003 | Mochizuki |
| 6,647,270 B1 | 11/2003 | Himmelstein |
| 6,665,637 B2 | 12/2003 | Bruhn |
| 6,668,042 B2 | 12/2003 | Michaelis |
| 6,678,250 B1 | 1/2004 | Grabelsky et al. |
| 6,724,862 B1 | 4/2004 | Shaffer et al. |
| 6,725,128 B2 | 4/2004 | Hogg et al. |
| 6,727,767 B2 | 4/2004 | Takada |
| 6,754,710 B1 | 6/2004 | McAlear |
| 6,760,312 B1 | 7/2004 | Hitzeman |
| 6,760,774 B1 | 7/2004 | Soumiya et al. |
| 6,765,905 B2 | 7/2004 | Gross et al. |
| 6,778,534 B1 | 8/2004 | Tal et al. |
| 6,792,092 B1 | 9/2004 | Michalewicz |
| 6,798,751 B1 | 9/2004 | Voit et al. |
| 6,798,786 B1 | 9/2004 | Lo et al. |
| 6,807,564 B1 | 10/2004 | Zellner et al. |
| 6,857,020 B1 | 2/2005 | Chaar et al. |
| 6,914,964 B1 | 7/2005 | Levine |
| 6,954,435 B2 | 10/2005 | Billhartz et al. |
| 6,964,023 B2 | 11/2005 | Maes et al. |
| 6,973,033 B1 | 12/2005 | Chiu et al. |
| 6,980,516 B1 | 12/2005 | Wibowo et al. |
| 6,988,133 B1 | 1/2006 | Zavalkovsky et al. |
| 7,003,462 B2 | 2/2006 | Shambaugh et al. |
| 7,003,574 B1 | 2/2006 | Bahl |
| 7,006,616 B1 | 2/2006 | Christofferson et al. |
| 7,010,097 B2 | 3/2006 | Zellner et al. |
| 7,010,581 B2 | 3/2006 | Brown et al. |
| 7,031,311 B2 | 4/2006 | MeLampy et al. |
| 7,031,327 B2 | 4/2006 | Lu |
| 7,043,435 B2 | 5/2006 | Knott et al. |
| 7,046,646 B2 | 5/2006 | Kilgore |
| 7,075,922 B2 | 7/2006 | Mussman et al. |
| 7,076,540 B2 | 7/2006 | Kurose et al. |
| 7,076,568 B2 | 7/2006 | Philbrick et al. |
| 7,089,189 B2 | 8/2006 | Lipe et al. |
| 7,099,440 B2 | 8/2006 | Michaelis |
| 7,103,542 B2 | 9/2006 | Doyle |
| 7,124,205 B2 | 10/2006 | Craft et al. |
| 7,165,035 B2 | 1/2007 | Zinser et al. |
| 7,170,855 B1 | 1/2007 | Mo et al. |
| 7,170,977 B2 | 1/2007 | Doherty et al. |
| 7,177,945 B2 | 2/2007 | Hong et al. |
| 7,184,434 B2 | 2/2007 | Ganti et al. |
| 7,212,969 B1 | 5/2007 | Bennett |
| 7,221,660 B1 | 5/2007 | Simonson et al. |
| 7,249,024 B2 | 7/2007 | Engstrom |
| 7,251,640 B2 | 7/2007 | Baumard |
| 7,257,120 B2 | 8/2007 | Saunders et al. |
| 7,260,439 B2 | 8/2007 | Foote et al. |
| 7,266,499 B2 | 9/2007 | Surace et al. |
| 7,269,252 B2 | 9/2007 | Eran |
| 7,272,563 B2 | 9/2007 | Nelson |
| 7,290,059 B2 | 10/2007 | Yadav |
| 7,295,555 B2 | 11/2007 | Elzur |
| 7,299,185 B2 | 11/2007 | Falcon et al. |
| 7,319,961 B2 | 1/2008 | Al-Dhubaib et al. |
| 7,321,591 B2 | 1/2008 | Daniel et al. |
| 7,349,851 B2 | 3/2008 | Zuberec et al. |
| 7,359,979 B2 | 4/2008 | Gentle et al. |
| 7,362,745 B1 | 4/2008 | Cope et al. |
| 7,363,371 B2 | 4/2008 | Kirkby et al. |
| 7,376,564 B2 | 5/2008 | Selg et al. |
| 7,398,212 B2 | 7/2008 | Yacoub |
| 7,437,297 B2 | 10/2008 | Chaar et al. |
| 7,454,351 B2 | 11/2008 | Jeschke et al. |
| 7,474,627 B2 | 1/2009 | Chheda et al. |
| 7,489,687 B2 | 2/2009 | Chavez et al. |
| 7,496,661 B1 | 2/2009 | Morford et al. |
| 7,502,741 B2 | 3/2009 | Finke et al. |
| 7,509,260 B2 | 3/2009 | Cross, Jr. et al. |
| 7,519,536 B2 | 4/2009 | Maes et al. |
| 7,522,719 B2 * | 4/2009 | Carlson et al. ........... 379/202.01 |
| 7,565,415 B1 | 7/2009 | Markowitz et al. |
| 2001/0012993 A1 | 8/2001 | Attimont et al. |
| 2001/0036157 A1 | 11/2001 | Blanc et al. |
| 2001/0039210 A1 | 11/2001 | St-Denis |
| 2002/0080808 A1 | 6/2002 | Leung |
| 2002/0085703 A1 | 7/2002 | Proctor |
| 2002/0091843 A1 | 7/2002 | Vaid |
| 2002/0105911 A1 | 8/2002 | Pruthi et al. |
| 2002/0116522 A1 | 8/2002 | Zelig |
| 2002/0143971 A1 | 10/2002 | Govindarajan et al. |
| 2002/0152319 A1 | 10/2002 | Amin et al. |
| 2002/0176404 A1 | 11/2002 | Girard |
| 2003/0002650 A1 | 1/2003 | Gruchala |
| 2003/0016653 A1 | 1/2003 | Davis |
| 2003/0016876 A1 | 1/2003 | Chai et al. |
| 2003/0086515 A1 | 5/2003 | Trans et al. |
| 2003/0120789 A1 | 6/2003 | Hepworth et al. |
| 2003/0227878 A1 | 12/2003 | Krumm-Heller |
| 2004/0073641 A1 | 4/2004 | Minhazuddin et al. |
| 2004/0073690 A1 | 4/2004 | Hepworth et al. |
| 2005/0031110 A1 * | 2/2005 | Haimovich et al. ...... 379/202.01 |
| 2005/0064899 A1 | 3/2005 | Angelopoulos et al. |
| 2005/0119892 A1 | 6/2005 | Agapi et al. |
| 2005/0119894 A1 | 6/2005 | Cutler et al. |
| 2005/0125229 A1 | 6/2005 | Kurzweil |
| 2005/0125230 A1 | 6/2005 | Haas |
| 2005/0131697 A1 | 6/2005 | Brown et al. |
| 2005/0131698 A1 | 6/2005 | Tischer |
| 2005/0131699 A1 | 6/2005 | Fukada |
| 2005/0131700 A1 | 6/2005 | Washburn et al. |
| 2005/0152523 A1 * | 7/2005 | Fellenstein et al. ...... 379/202.01 |
| 2005/0154590 A1 | 7/2005 | Coffey et al. |
| 2005/0177370 A1 | 8/2005 | Hwang et al. |
| 2005/0180323 A1 | 8/2005 | Beightol et al. |
| 2005/0186933 A1 | 8/2005 | Trans |
| 2005/0192808 A1 | 9/2005 | Sugiyama |
| 2005/0203746 A1 | 9/2005 | Obata |
| 2005/0216268 A1 | 9/2005 | Kannappan |
| 2005/0228673 A1 | 10/2005 | Nefian et al. |
| 2005/0228674 A1 | 10/2005 | Gunn et al. |
| 2005/0228675 A1 | 10/2005 | Trinkel et al. |
| 2005/0240409 A1 | 10/2005 | Gallistel |
| 2005/0240410 A1 | 10/2005 | Charles et al. |

| | | |
|---|---|---|
| 2005/0240412 A1 | 10/2005 | Fujita |
| 2005/0240413 A1 | 10/2005 | Asano et al. |
| 2005/0246173 A1 | 11/2005 | Creamer et al. |
| 2005/0246174 A1 | 11/2005 | DeGolia |
| 2005/0256717 A1 | 11/2005 | Miyata et al. |
| 2005/0261035 A1 | 11/2005 | Groskreutz et al. |
| 2005/0261907 A1 | 11/2005 | Smolenski et al. |
| 2005/0273339 A1 | 12/2005 | Chaudhari et al. |
| 2005/0278148 A1 | 12/2005 | Bader et al. |
| 2005/0278177 A1 | 12/2005 | Gottesman |
| 2005/0278178 A1 | 12/2005 | Girouard et al. |
| 2005/0283366 A1 | 12/2005 | Lee |
| 2005/0283367 A1 | 12/2005 | Ativanichayaphong et al. |
| 2005/0283368 A1 | 12/2005 | Leung |
| 2005/0288933 A1 | 12/2005 | Nakamura et al. |
| 2005/0288934 A1 | 12/2005 | Omi |
| 2005/0288935 A1 | 12/2005 | Lee et al. |
| 2006/0004579 A1 | 1/2006 | Claudatos et al. |
| 2006/0009979 A1 | 1/2006 | McHale et al. |
| 2006/0009980 A1 | 1/2006 | Burke et al. |
| 2006/0020468 A1 | 1/2006 | Hilliard |
| 2006/0020469 A1 | 1/2006 | Rast |
| 2006/0031073 A1 | 2/2006 | Anglin et al. |
| 2006/0036440 A1 | 2/2006 | Kunkel |
| 2006/0047515 A1 | 3/2006 | Connors |
| 2006/0067486 A1 | 3/2006 | Zellner et al. |
| 2006/0069568 A1 | 3/2006 | Passaretti et al. |
| 2006/0069570 A1 | 3/2006 | Allison et al. |
| 2006/0069779 A1 | 3/2006 | Sundqvist et al. |
| 2006/0074679 A1 | 4/2006 | Pifer et al. |
| 2006/0074681 A1 | 4/2006 | Janiszewski et al. |
| 2006/0074682 A1 | 4/2006 | Chou et al. |
| 2006/0080103 A1 | 4/2006 | Van Breemen |
| 2006/0080104 A1 | 4/2006 | Dang |
| 2006/0100879 A1 | 5/2006 | Jakobsen et al. |
| 2006/0100880 A1 | 5/2006 | Yamamoto et al. |
| 2006/0100881 A1 | 5/2006 | He |
| 2006/0100882 A1 | 5/2006 | Eves et al. |
| 2006/0100883 A1 | 5/2006 | Miyamoto et al. |
| 2006/0106610 A1 | 5/2006 | Napper |
| 2006/0106611 A1 | 5/2006 | Krasikov et al. |
| 2006/0106613 A1 | 5/2006 | Mills |
| 2006/0116880 A1 | 6/2006 | Gober |
| 2006/0116881 A1 | 6/2006 | Umezawa et al. |
| 2006/0129405 A1 | 6/2006 | Elfanbaum |
| 2006/0136217 A1 | 6/2006 | Mullin |
| 2006/0143014 A1 | 6/2006 | Cheng et al. |
| 2006/0143015 A1 | 6/2006 | Knott et al. |
| 2006/0161440 A1 | 7/2006 | Nakayama et al. |
| 2006/0167694 A1 | 7/2006 | Mitsuyoshi |
| 2006/0167695 A1 | 7/2006 | Spille et al. |
| 2006/0173688 A1 | 8/2006 | Whitham |
| 2006/0190262 A1 | 8/2006 | Roskind |
| 2006/0195322 A1 | 8/2006 | Broussard et al. |
| 2006/0217985 A1 | 9/2006 | Noguchi et al. |
| 2006/0235693 A1 | 10/2006 | Ruderman et al. |
| 2006/0247931 A1 | 11/2006 | Caskey et al. |
| 2006/0247932 A1 | 11/2006 | Yamamoto |
| 2007/0103317 A1 | 5/2007 | Zellner et al. |
| 2007/0133403 A1 | 6/2007 | Hepworth et al. |
| 2007/0168195 A1 | 7/2007 | Wilkin et al. |
| 2007/0172083 A1 | 7/2007 | Tseng et al. |
| 2008/0117869 A1 | 5/2008 | Freen et al. |
| 2008/0151886 A1 | 6/2008 | Gentle et al. |
| 2008/0151898 A1 | 6/2008 | Gentle et al. |
| 2008/0151921 A1 | 6/2008 | Gentle et al. |
| 2009/0168984 A1* | 7/2009 | Kreiner et al. ........... 379/202.01 |

FOREIGN PATENT DOCUMENTS

| | | |
|---|---|---|
| EP | 0982920 | 3/2000 |
| EP | 1549035 | 6/2005 |
| JP | 2006-340376 | 12/2006 |
| WO | WO 91/14278 | 9/1991 |
| WO | WO 98/46035 | 10/1998 |
| WO | WO 99/51038 | 10/1999 |
| WO | WO 00/41090 | 7/2000 |
| WO | WO 00/72563 | 11/2000 |
| WO | WO 01/26393 | 4/2001 |
| WO | WO 01/75705 | 10/2001 |
| WO | WO 02/00316 | 1/2002 |

OTHER PUBLICATIONS

Official Action (including Translation of an office action (extract)) for German Patent Application No. 10 2008 062 981.2-56, mailed Jun. 24, 2009.

"Squelch" from Wikipedia; printed from Internet at: http://en.wikipedia.org/w/index.php?title=Squelch&printable=yes; 4 pages.

Newly-released feature and enhancement highlights of "Avaya MultiVantage Software"; Release 11, Jan. 2003; 9 pages.

U.S. Appl. No. 12/133,533, filed Jun. 5, 2008, Kloberdans et al.

U.S. Appl. No. 10/882,975, filed Jun. 30, 2004, Becker et al.

U.S. Appl. No. 11/671,733, filed Feb. 6, 2007, Beck et al.

"Access for 9-1-1 and Telephone Emergency Services," American with Disabilities Act, U.S. Department of Justice (Jul. 15, 1998), available at http://www.usdoj.gov/crt/ada/911ta.htm, 11 pages.

"Comments of the National Association of State Utility Consumer Advocates," filed with the Federal Communications Commission, Washington, D.C. (May 28, 2004), pp. 1-74.

"NANPA ANI II Digits," NeuStar, Inc. (2003), available at http://www.nanpa.com/number_resource_info/ani_ii_assignments.html, 5 pages.

"Packet Loss and Packet Loss Concealment Technical Brief," Nortel Networks at http://www.nortelnetworks.com (2000).

"Telogy Networks' Voice Over Packet White Paper," Telogy Networks, Inc., available at http://www.telogy.com/our_products/golden_gateway/VOPwhite.html (Jan. 1998).

"Voice over packet: An assessment of voice performance on packet networks white paper," Nortel Networks, Publication No. 74007.25/09-01, at http://www.nortelnetworks.com (2001).

Application Note, Emergency 911 in Packet Networks, http:www.fastcomm.com/NewWeb/solutions/e911.html, Sep. 5, 2001, FastComm Communications Corporation,3 pgs.

Baker (Editor), "Requirements for IP Version 4 Routers", RFC 1812, Jun. 1995, 175 pages.

Benjamin et al. "A Survey of Error-Concealment Schemes for Real-Time Audio and Video Transmissions over the Internet" Department of Electrical and Computer Engineering and the Coordinate Science Laboratory, University of Illinois at Urbana-Champaign, Proc. IEEE Int'l Symposium on Multimedia Software Engineering, Dec. 2000.

Bernet et al., "Specification of the Null Service Type", RFC 2997, Nov. 2000, 12 pages.

Bernet, "Format of the RSVP DCLASS Object", RFC 2996, Nov. 2000, 9 pages.

Berney et al., "A Framework for Integrated Services Operation over Diffserv Networks", RFC 2998, Nov. 2000, 29 pages.

Braden et al. "Resource ReSerVation Protocol (RSVP)", RFC 2205, Sep. 1997, 6 pages.

Brown, I. Internet Engineering Task Force, Securing Prioritised Emergency Traffic, http://www.iepscheme.net/docs/draft-brown-ieps-sec-00.txt, Jul. 5, 2001, pp. 1-12.

Carlberg, Ken. Internet Engineering Task Force, Framework for Supporting IEPS in IP Telephony, http://www.iepscheme.net/docs/draft-carlberg-ieps-framework-01.tex, Jul. 4, 2001, pp. 1-24.

Chan et al., "COPS Usage for Policy Provisioning (COPS-PR)", RFC 3084, Mar. 2001, 32 pages.

Cisco IP Phone 7960, eLearning Tutorial, at www.cisco.com/warp/public/779/largeent/avvid/products/7960/7960_show_using_help.htm.

Cisco Systems, "Cisco Emergency Responder Version 1.1 Data Sheet" (Oct. 2001), 5 pages, copyright 1992-2001.

Ejaz Mahfuz; "Packet Loss Concealment for Voice Transmission Over IP Networks" (2001) (Master thesis, Department of Electrical Engineering, McGill University) (on file with author).

Floyd et al., "Random Early Detection Gateways for Congestion Avoidance", IEEE/ACM Transaction on Networking, Aug. 1993, 22 pages.

Geeta Desai Chennubhotla, "Embedded Systems: Rough start, but voice market growing," EE Times, at http://www.eetimes.com/in_focus/embedded_systems/EOG20020503S0067 (May 6, 2002).

Getting Started with the Cisco IP Phone 7960/7940, pp. 1-1 to 1-4, date unknown.

Government Emergency Telecommunications Service (GETS), "White Paper on IP Teleponhy a Roadmap to Supporting Gets in IP Networks," Apr. 27, 2000, Science Applications International Corporation, pp. 1-32.

Grigonis, Computer Telephony Encyclopedia, pp. 268-277 (2000).

Handley et al., "SIP: Session Initiation Protocol", RFC 2543, Mar. 1999, 81 pages.

Herzog et al., "COPS Usage for RSVP", RFC 2749, Jan. 2000, 16 pages.

Huai-Rong Shao et al., "A New Framework for Adaptive Multimedia over the Next Generation Internet," Microsoft Research China, date unknown 4 pages.

IEEE Standards for Information Technology—Telecommunications and information exchange between systems—Local and metropolitan area networks—Common specifications—Part 3: Media Access Control (MAC) Bridges, LAN/MAN Standards Committee of the IEEE Computer Society, ANSI/IEEE Std 802.1D, 1998.

IEEE Standards for Local and Metropolitan Area Networks: Virtual Bridged Local Area Networks, The Institute of Electrical and Electronics Engineers, IEEE Std 802.1Q-1998 (Mar. 8, 1999).

International Emergency Preference Scheme (IEPS), http://www.iepscheme.net/, Jun. 16, 2000, pp. 1-2.

International Engineering Consortium, "Silence Suppression and Comfort Noise Generation" at http://www.iec.org/online/tutorials/voice_qual/topic07.html (Jul. 1, 2002).

International Telecommunication Union; "General Aspects of Digital Transmission Systems: Coding of Speech at 8kbit/s Using Conjugate-Structure Algebraic-Code-Excited Linear-Prediction" (CS-ACELP) ITU-T Recommendation G.729 (Mar. 1996).

Itu, "Packet-based multimedia communications systems", H. 323, Feb. 1998, 125 pages.

J. Heinanen et al., "Assured Forwarding PHB Group," Network Working Group, Category: Standards Track (Jun. 1999).

K. Nichols, Cisco Systems, RFC 2474, Definition of Differentiated Services Field in IPv4 & IPv6 Headers, Dec. 1998.

Kathy Lynn Hewitt, Desktop Video Conferencing: A Low Cost and Scalable Solution to Distance Education, "Chapter 2—Internet Conferencing Protocols" thesis submitted to North Carolina State University (1997), at http://www2.ncsu.edu/eos/service/ece/project/succeed_info/klhewitt/thesis/toc.html.

Le Boudec, Jean-Yves et al., slideshow entitled "Quality of Service in IP Networks (2)," Queue Management (undated), pp. 1-30.

McCloghrie et al., "Structure of Policy Provisioning Information (SPPI)", RFC 3159, Aug. 2001, 38 pages.

PacketCable, Cable Labs, http://www.packetcable.com, copyright 2000-2002.

PacketCableTM Dynamic Quality-of-Service Specification PKT-SP-DQOS-102-000818, 2000, Cable Television Laboratories, Inc., 211 pages.

Paul Roller Michaelis, "Speech Digitization and Compression", Int'l Encyclopedia of Ergonomic and Human Factors (W. Warkowski ed., Taylor & Francis 2001).

Peter Parnes, "Real-time Transfer Protocol (RTP)" (Sep. 8, 1997), at www.cdt.luth.se/~peppar/docs/lic/html/node166.html.

RADVision, "SIP: Protocol Overview," (2001), pp. 1-16.

S. Blake et al., "An Architecture for Differentiated Services," Network Working Group, Category: Informational (Dec. 1998).

Sangeun Han et al., "Transmitting Scalable Video over a DiffServ network," EE368C Project Proposal (Jan. 30, 2001).

Schulzrinne, "Emergency Call Services for SIP-based Internet Telephony," Internet Engineering Task Force (Mar. 25, 2001), pp. 1-17.

Schulzrinne. Providing Emergency Call Services for SIP-based Internet Telephony, http//www.softarmor.com/sipping/drafts/draft-schulzrinne-sip-911-00.txt., Jul. 13, 2000, pp. 1-13.

TechTarget, "voice activation detection," at http://searchnetworking.te . . . m/sDefinition/0,,sid7_gci342466.00.html (Jul. 1, 2002).

V. Jacobson et al., "An Expedited Forwarding PHB," Network Working Group, Category: Standards Track (Jun. 1999).

Wroclawski, "The use of RSVP with IETF Integrated Services", RFC 2210, Sep. 1997, 31 pages.

3COM, 3Com IP Conferencing and Presence Modules, Dec. 2006, pp. 1-2, http://www.3com.com/other/pdfs/products/en_US/3com_400867.pdf.

Chelston Call Systems, How Audio Conferencing Can Benefit Your Organisation, Jan. 2, 2008, pp. 1-3, http://www.chelston.co.uk/Welcome/Pages/Products/Audio-Conferencing.htm.

Ditech Networks, Conferencing Voice Quality and Echo Cancellation, (undated) (printed Jan. 2, 2008), pp. 1-4, http:/www.ditechcom.com/solutions/solutionsdetail.aspx?pid=44.

Global IP Solutions, Backgrounder, (undated) (printed Jan. 2, 2008), pp. 2-6, http://www.gipscorp.com/default/backgrounder.html.

Indosoft Inc., Teleconferencing Bridge Features, 2005, pp. 1-6, http:/www.indosoft.ca/features.htm.

Iwatsu Voice Networks, News: Iwatsu Announces the Release of the IX-CNFBOX-1 Eight-Party Conference Bridge for ADIX, Feb. 26, 1998, pp. 1, http://ivoicenetworks.com/News/pr-cfnb.html.

NEC America, Conference Bridge Solution for the Electrak Elite IPK/IPK II, Jan. 2006, pp. 1-2, available at http://www.necunifiedsolutions.com/Downloads/PDFs/790304_EE_IPK_II_ConfBridge.pdf.

NEC Infrontia Inc., Aspire Conference Bridge data Sheet, 2007, pp. 1-2, http://www.necaspire.com/necaspire/conference_bridge/conference_bridge.php.

Polycom Inc., Polycom VoicePlus, Full featured PSTN and VoIP conferencing, 2003, pp. 1-2, available at http://www.ccpin.com/pdf/PolycomNoicePlus.pdf.

Skype Journal, High Definition Voice: Bringing Skype's high Bandwidth Audio to Conference Calls, Oct. 23, 2007, pp. 1-5, http://skypejournal.com/blog/2007/10/high_definition_voice_bringing.html.

Thomasnet, ShoreTel Extends Portfolio of Collaboration Solutions with SIP-Enabled ShoreTel IP 8000 Conference Phone, Jul. 17, 2007, pp. 1-2, http://news.thomasnet.com/printready.html?prid=525606.

TMCNET, Aastra selects Octasic OCT6100 device for CNX Conference Bridge Appliance, Mar. 8, 2005, pp. 1-2, http://www.tmcnet.com/usubmit/2005/Mar/1123217.htm.

Search Report for British Patent Application No. GB0823697.8, mailed Apr. 9, 2009.

Background of the Invention for the above-captioned application (previously provided).

Official Action wit English translation for German Patent Application No. 102008062981.2, dated Aug. 9, 2011 16 pages.

Official Action with English translation for German Patent Application No. 102008062981.2, dated Dec. 23, 2011 13 pages.

Official Action for United Kingdom Patent Application No. GB082367.8, dated Feb. 20, 2012 2 pages.

Official Action for JP Patent Application No. 2008-331668, mailed Mar. 14, 2012 3 pages (English translation).

* cited by examiner

METHOD AND APPARATUS FOR IDENTIFYING AND ELIMINATING THE SOURCE OF BACKGROUND NOISE IN MULTI-PARTY TELECONFERENCES

FIELD OF THE INVENTION

An exemplary embodiment of this invention relates to communications devices, protocols and techniques. More specifically, an exemplary aspect of this invention relates to teleconferences, and the identification and reduction of noise therein.

BACKGROUND OF THE INVENTION

Traditionally, when unacceptable background noise levels have been experienced on voice calls, the party experiencing the noise has simply turned down the volume setting, which reduces the background noise level but at the expense of the user's ability to hear the voice of the other party. Alternatively, in a manned conference-bridge type environment, a conference bridge operator can manually check the various lines of the conference call and turn down the volume on noisy lines.

In situations where the background noise is caused by a party being in a noisy location, solutions such as local mute and far-end mute are known. The obvious disadvantage to these approaches is that they do not distinguish between noise and voice.

Solutions such as highly directional handset microphones and speakerphones can do a good job of filtering out background noises, but they require the user to be positioned precisely or they, too, get filtered.

Prior to the development of electret microphones, telephone handsets used carbon microphones. Essentially, these are small canisters, filled with powdered carbon. The top of the canister was covered with a thin, highly flexible diaphragm. When sound waves pressed on the diaphragm, it would cause the carbon powder to be compressed, thereby reducing the electrical resistance of the canister. An interesting artifact of this design is that if sounds aren't loud enough to squeeze the carbon, they are not transmitted by the microphone. For this reason, carbon microphones are pretty good at filtering out the background noise at the user's location.

Electret microphones do not have this non-linear behavior. Because of their inherent ability to pick up low-amplitude sounds in addition to the user's voice, it became necessary to supplement the microphones with an expander circuit starting approximately 20 years ago. The expander circuit would measure the signal strength of the microphone and then, if the signal strength was below a predetermined threshold level, the transmitted signal would be attenuated electronically by an additional amount, perhaps 10 db.

When the background noise was at a level below the attenuator's threshold, the expander actually worked well. Needless to say, the expander was useless when the background noise was above the threshold, but the condition that was especially troubling was when the background noise was close to the threshold level, thereby causing the attenuator to kick in and out. For the listening party, the effect often sounded like heavy breathing.

SUMMARY OF THE INVENTION

This problem of an attenuator activating and deactivating inappropriately does not seem to occur with today's handsets, possibly because the location of the microphone is better than in early generation handsets. Nonetheless, the problem can still be heard when someone at the far end is using a speakerphone, especially when the background noise level is close to the threshold of the voice switch. Furthermore, there still exists a problem of undesirable background noises being transmitted when the noise is loud, regardless of whether the sender is using a handset of a speakerphone.

In accordance with a first embodiment of this invention, a mechanism is provided that allows participants on the conference call to identify a participant(s) responsible for introducing the noise, regardless of whether the noise is caused by transmission impairments or by the participant(s) being in a noisy location. For example, individual users could be able to press a "test" button that would block each of the participants one at a time. This would allow the source of the noise to be identified. The "test button" could be one or more of located at the endpoint(s), be enabled through a web interface or, for example, through a dedicated conference call interface at the endpoint(s) or at the conference bridge. The blocking of each participant could occur through interaction with the main PBX using, for example, in-band signaling to the PBX. Alternatively, or in addition, in- or out-of-band signaling could be used in an IP telephony environment.

Being able to block each participant one at a time, allows the source of the noise to be identified. This is especially true when the noise is due to transmission impairments, where, for example, participant number one would sound noise-free to participant number two, but sound very noisy to participant number three. By allowing selected one-at-a-time blocking, it would be easier to identify the source(s) of noise.

In accordance with a second exemplary embodiment, a mechanism is provided which allows individual users to be queried about how to handle the presence of a noise-introducing conference participant. After identifying the offending participant(s) several options could be presented. Illustratively, an option that could be offered is selective far-end mute, whereby each participant could selectively mute any other conference participant. (For example, in the scenario described in the previous paragraph, participant three could mute the transmissions from participant one to participant three, without affecting the transmissions of participant one to participant two.) If more than one party is introducing noise, individual far-end mute/unmute keys or buttons can be assigned on the listening party's telephone. In an exemplary embodiment, when speech is detected on a muted line, a light can flash or other indicator be utilized such as a message conveyed as a whisper page. As a result of the queries to the various users about noise-introducing conference participants, this information could be assembled into a report-based format as well.

Other corrective measures may also be implemented at the user(s) node or the other node of the "bad" line or at an intermediate node, such as a conference call mixer. For example, the background noise on the "bad" line can be identified and characterized, thereby allowing the use of suitable filters to improve the signal-to-noise ratio. Alternatively, or in addition, an automatic mute may be performed in which the line is unmuted automatically when speech is detected. After speech ends, the line may again be muted automatically. The remote mute feature can be implemented for each channel from each person's perspective recognizing that noise for one conference call participant may not be present for another conference call participant.

In accordance with another exemplary embodiment, control over the transmitted signal is provided to address why handset expanders and the voice switches and speakerphones are prone to failure. Specifically, the threshold level at which the attenuator and/or voice switch gets triggered is not adjustable by the listener and does not allow different adjustments for individual listeners. In accordance with this exemplary embodiment, each listening party is capable of adjusting the transmitting parties' expanders and/or voice switch. This is different than what is commonly referred to as "squelch" in that the listener exercises control over the transmitter, as opposed to allowing the listener to do amplitude-based filtering of the received signal. This functionality could be provided in one or more of a PBX, endpoint, conference call mixer, communications server or the like.

Some of the embodiments discussed above, adjustments made by participant one to the signal they received from participant number 2 can be global, i.e., heard by all other participants, or the adjustments can affect only that specific person-to-person transmission path.

Within the prior art, when noise is coming from a source that a conference participant can identify, operators have to manually test each line. One exemplary advantage of the present invention is the participants can check the lines even while a conference is in progress and continue even if there is a bad line without the interruption of an operator trying to determine problem lines. Another exemplary advantage associated with the above inventions is that the listener can exercise control over the transmitter, as opposed to doing amplitude-based filtering of the received signal.

Exemplary aspects of this invention thus relate to communications management. More specifically, exemplary aspects of the invention relate to noise reduction. Still further aspects of the invention relate to noise reduction in a conference call environment.

Additional exemplary aspects of the invention relate to providing individual conference call listeners the ability to identity which transmitting party(s) sounds noisy to them, coupled with the ability of the listeners to adjust the noisy transmitter(s) in a way that is heard by all listeners or heard by only the person who is making the adjustment.

Still further aspects of the invention relate to blocking one or more of the participant in a conference call.

Still further aspects of the invention relate to providing selective far-end mute capability which may be manually implemented and/or automatic.

Still further aspects of the invention relate to providing suitable filters to remove noise associated with a conference call participant.

Still further aspects of the invention relate to providing the ability for each listening party to adjust each transmitting party's expander (background noise filter) and/or voice switch.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet switched types of communications can be used with the present invention, the concepts and techniques disclosed herein are applicable to other protocols such as Session Initiation Protocol or SIP, which is a simple signaling/application layer protocol for network multimedia conferencing and telephony, multimedia conferencing, audio and video conferencing and the like. For example, video noise can be a significant problem in video telephony, causing noticeable degradations in the picture quality.

Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented

DETAILED DESCRIPTION OF THE INVENTION

The invention will be described below in relation to a conference call environment. Although well suited for use with circuit-switched or packet switched networks, the invention is not limited to use with any particular type of communication system or configuration of system elements and those skilled in the art will recognize that the disclosed techniques may be used in any application in which it is desirable to provide noise reduction in a conference call. For example, these systems and methods of this invention will also work well with SIP-based communication systems and endpoints. Moreover, the various endpoints described herein can be any communications device such as a telephone, speakerphone, cellular phone, SIP enabled endpoint, softphone, PDA, wired or wireless communication device, or in general any communications device that is capable of sending and/or receiving voice communications.

The exemplary systems and methods of this invention will also be described in relation to software, modules and associated hardware and network(s). However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
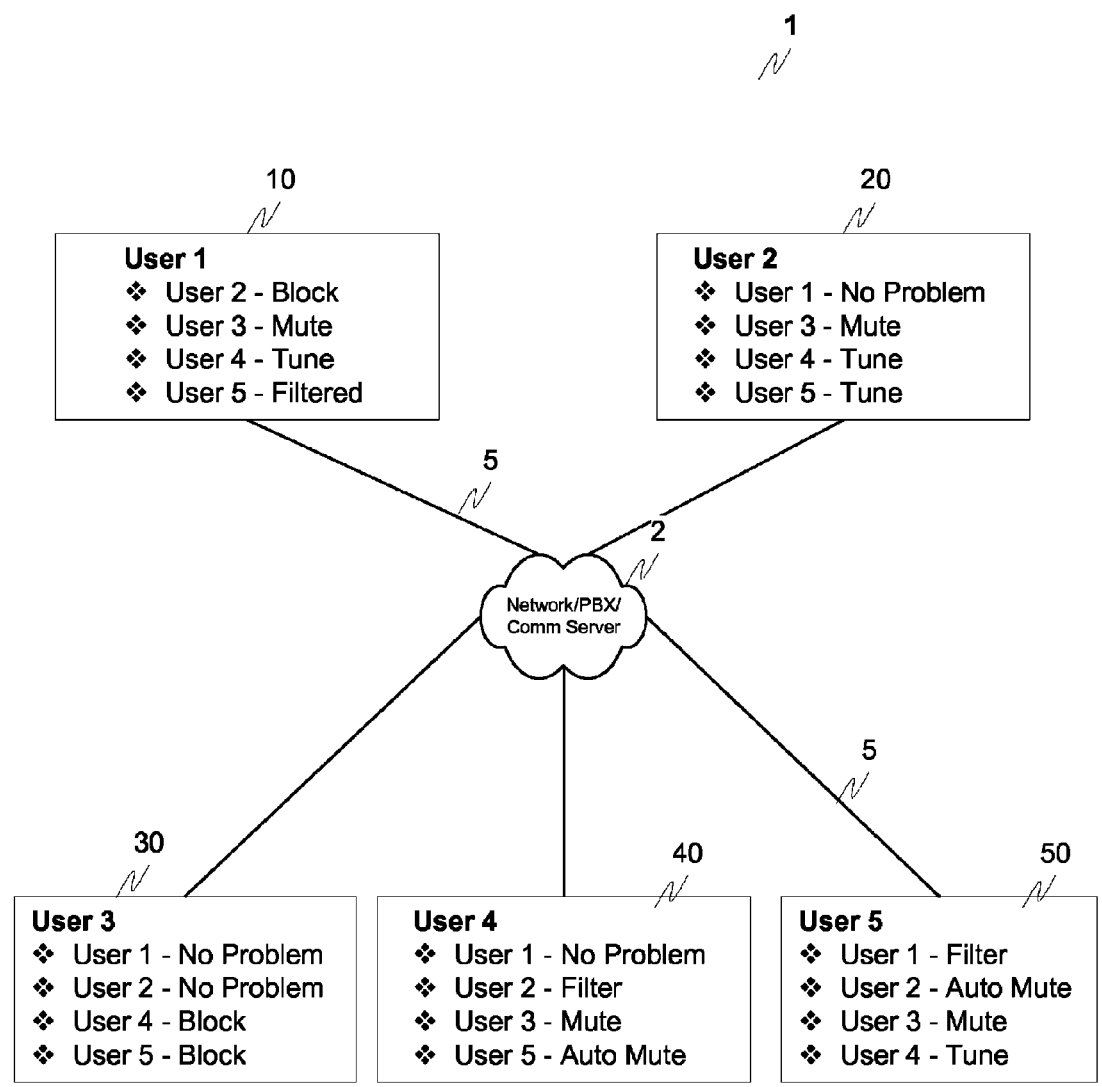
FIG. 1 illustrates an exemplary conference call environment according to this invention.

FIG. 1 illustrates an exemplary communications system according to this invention. The communication system 1 includes one or more endpoints (10, 20, 30, 40, 50) interconnected via one or more networks 2 and links 5. The network 2, in addition to traditional telecommunications architectural components, can also include one or more PBXs, communications servers, manned or unmanned conference call mixers, or the like. The links 5 can be wired or wireless links or any combination thereof that are capable of exchanging information between the various endpoints.

As illustrated in the communications system 1, each of the five users (call participants) can be presented with a display, such as a graphical user interface, that shows the status of the other users participating in a conference call. For example, the interface 10 for User 1 shows that User 2 is in the block or "test" state, User 3 is muted, User 4 has been tuned and User 5 has been filtered.

For User 1, the user has blocked User 2 to, for example, attempt and identify the source of noise in a conference. As previously discussed, a user can select, for example, a button on their endpoint that corresponds to each user they want to block thereby testing whether or not the other conference call participant is a source of the noise. A user can systematically test each other conference call participant and then, as discussed, one or more of mute, tune or filter participants associated with the source of the noise.

As illustrated in FIG. 1, and the various interfaces for different users discussed hereinafter, each user can be provided with this functionality appreciating that a first user may experience noise with another conference call participant, where a second user may not have the same noisy experience.

For example, User 3 at endpoint 30 is not having a problem with conference call participant 1 or 2, but has blocked Users at 4 and 5 in an attempt to locate the source of noise on the call. User 4 at endpoint 40 has set established an initial configuration for the conference call indicating that there is no problem with User 1, has implemented a filter for User 2, has placed User 3 on manual mute and User 5 on auto-mute.

Figure 2:
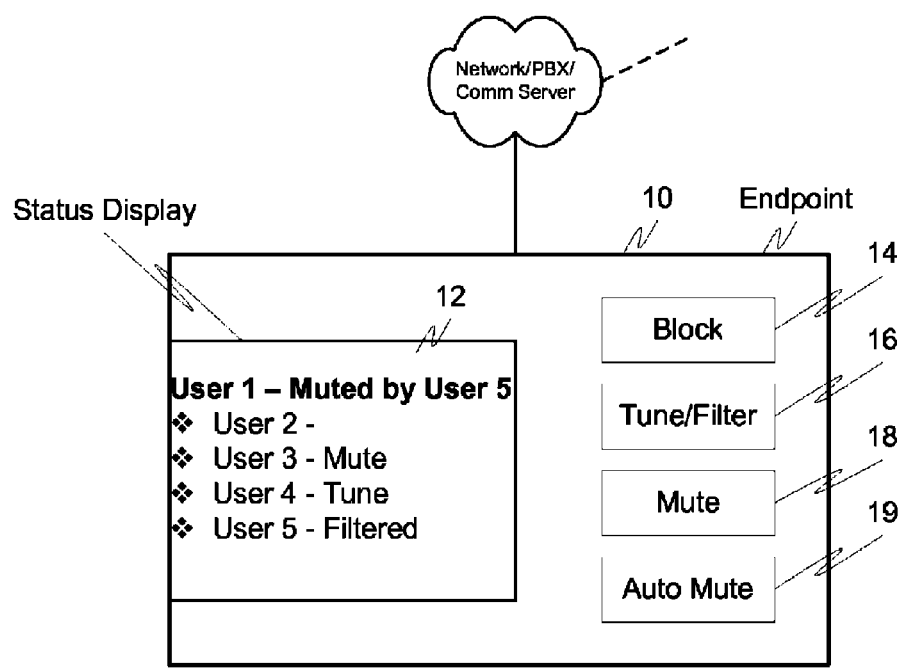
FIG. 2 illustrates an exemplary endpoint according to this invention.

FIG. 2 illustrates in greater detail an exemplary endpoint 10 for User 1. Endpoint 10 includes the status display 12 as well as modules that provide the various functionalities discussed above. More specifically, the block module 14 allows each other conference call participant to test or block this specific endpoint 10, as well as allows the user associated with endpoint 10 to selectively block one or more of the other conference call participants. When a conference participant is blocked, no audio information from that user's communication channel is audible. This blocking can be user centric or applied globally to the conference for all conference participants. Blocking can be accomplished by muting all information from the blocked channel(s).

In a similar manner, the tune module 16, mute module 18 and auto mute module 19 allow the tuning, muting and auto muting, respectively, functionality to be implemented by the user associated with this specific endpoint to other conference call participants, as well as provides functionality for other conference call participants to manipulate this specific endpoint, and thus, for example, adjust the conference call signal received by them.

As illustrated in the status display 12 of endpoint 10 in FIG. 2, the status of various users can optionally be displayed, as well as an indication provided to the user associated with endpoint 10 of actions taken by other conference call participants against this particular endpoint. In this illustrative example, a notice is provided to User 1 that their endpoint has been muted by User 5. The status display 12 could also be expanded to include all or a portion of this type of information relative to one or more of the other conference call participants.

The tune/filter module 16 allows a user to adjust one or more of the transmitting party's expander and voice switch. In a similar manner to the block module 14, if a user selects to tune another conference call participant, the other conference call participant is identified and the user provided with, for example, an interface that allows the adjusting of the expander or voice switch either automatically or manually, for example, with the slider bars or the like. The settings for one or more other "tuned" conference call participants can be shown in the status display 12 and in a similar manner, the user associated with endpoint 10 provided with the tune settings that are being used by other conference call participants on the endpoint 10. In this manner, information can be shared between conference call participants (or with a manned conference call bridge) to assist with noise reduction in a conference call environment.

For filtering, the tune/filter module allows a user to filter one or more other conference call participants either at the near-end or at the call mixer to reduce, for example, noise. In addition to adjustments that may be made to the expander mechanisms (such as the threshold level at which the expander kicks in and the degree of attenuation that is added to the transmitted signal when the user is not speaking), many other types of filtering may be used in conjunction with this invention. Examples include spectral filtering, amplitude normalization, adjustments to the "comfort noise" that is provided in response to packet loss, and the automatic removal of clicks, pops, and other types of transient non-speech events.

The mute module 18 allows the user associated with endpoint 10 to selectively mute one or more other conference call participants manually. As discussed, an indicator can be provided when voice communications are detected at one or more of the other muted endpoints and this indicator provided to the user associated with endpoint 10 via, for example, the status display 12 or other comparable audio or visual queue.

The auto mute module 19 allows the user associated with endpoint 10 to selectively automatically mute one or more other conference call participants. Similar to the other modules discussed above, the auto-mute module 19 also provides the functionality to mute endpoint 10 at the requested one or more other conference call participants. If a user is auto muted, signals from that user are not transmitted to one or more of the other conference call participants unless a voice is detected.

Figure 3:
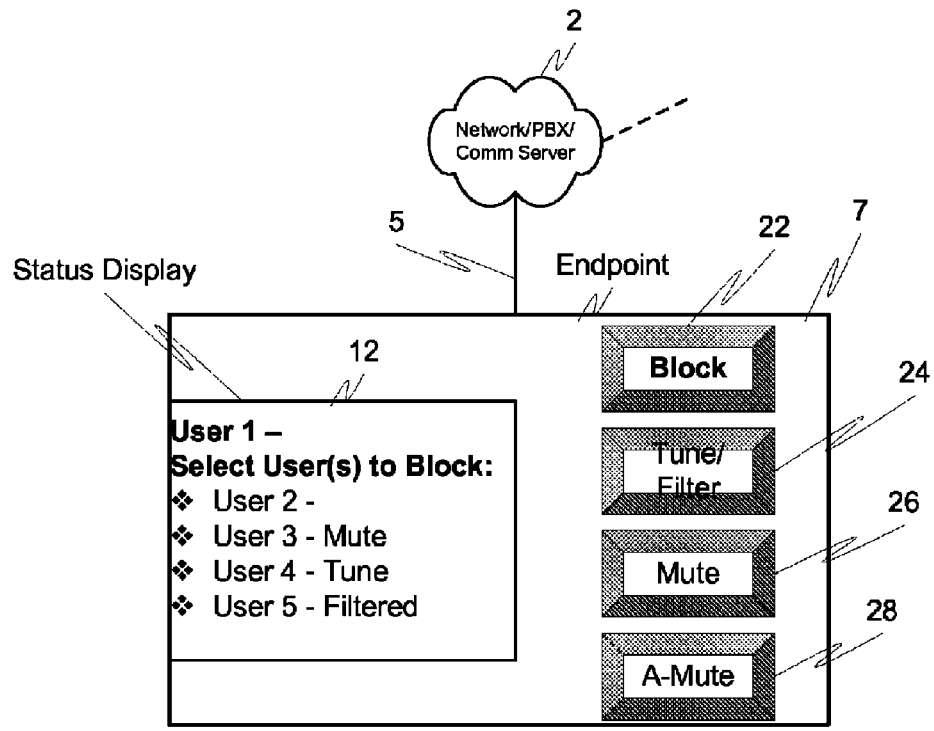
FIG. 3 illustrates an exemplary interface associated with an endpoint according to this invention.

FIG. 3 illustrates an exemplary interface associated with an endpoint. The interface 7 includes one or more buttons 22-28 as well as a status display 12. In this particular exemplary embodiment, a block button 22, tune button 24, mute button 26 and automatic mute button 28 are provided that allow the implementation of the functionality discussed above in relation to the block, tune, mute and auto-mute modules, respectively.

In this particular exemplary embodiment, a user has selected the block button 22 (highlighted by the bold text) at which point the status display 12 is updated to reflect the status of the other users and provide the ability for the user to select one or more of the other conference call participants that are to be blocked. In accordance with this particular exemplary embodiment, User 3 has been muted, User 4 has been tuned and User 5 has been filtered and no particular action has been taken against User 2. User 1 could then opt to block user 2 in an attempt to identify the source of a noisy conference call participant.

In a similar manner, the various other buttons can be selected with the status display 12 being updated to one or more of allow the user associated with the endpoint to select the other conference call participant(s) on which the function should be implemented and/or adjust the parameters associated with the selected function. For example, on selection of the tune button 24, the status display 12 can be updated to show which, if any, other users have been tuned and by whom, and optionally show the parameters associated with each of the tuned users.

The various buttons can be one or more of physical buttons associated with an endpoint and soft buttons, such as those found in a user interface.

Figure 4:
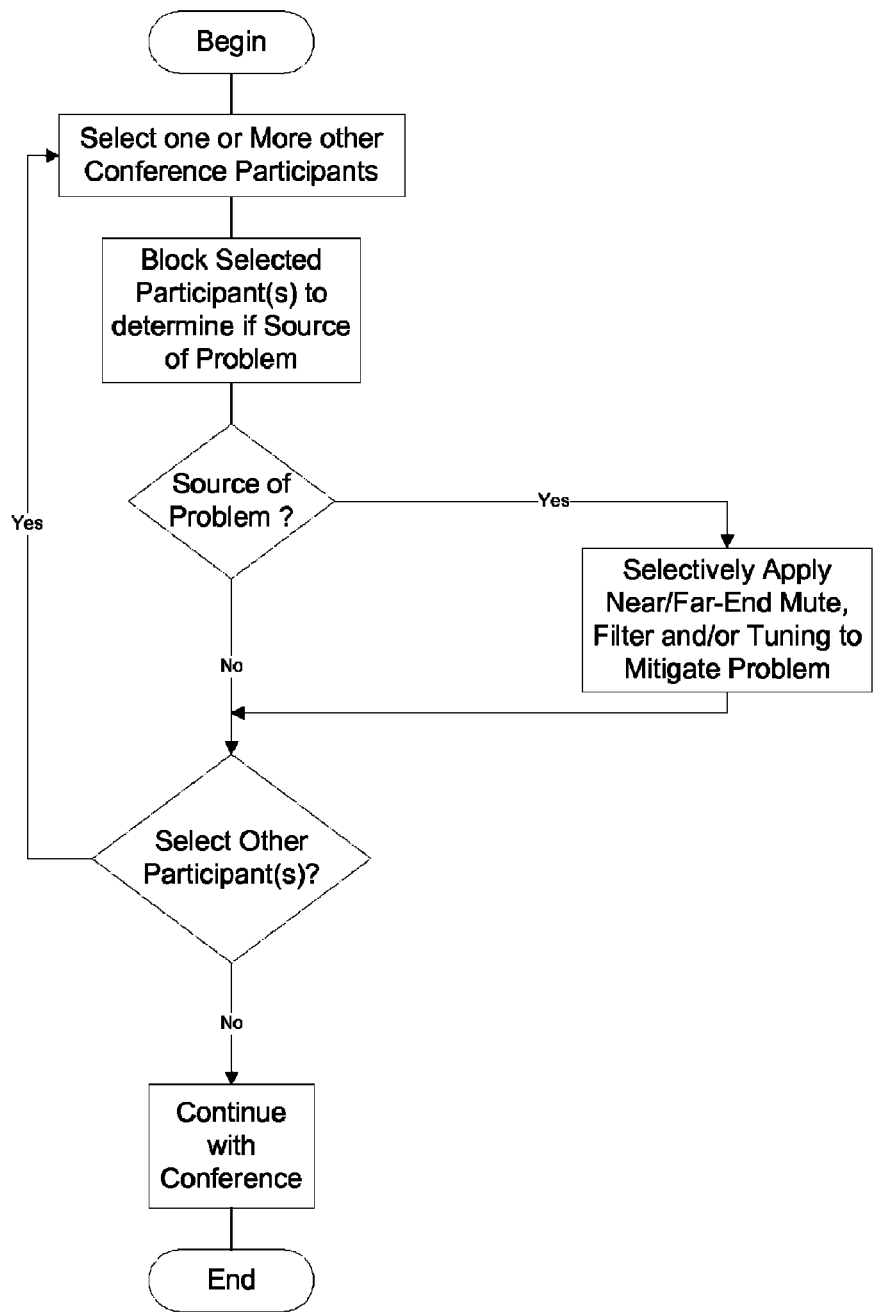
FIG. 4 is a flow chart illustrating an exemplary method for identifying and reducing noise from noisy conference call participants.

FIG. 4 illustrates an exemplary method for reducing noise in a conference call environment. In particular, control begins in step S400 and continues to step S410. In step S410, one or more conference call participants are selected. Next in step S420, one or more participants can be selected and blocked to assist with the determination of the source of a problem, such as noise. Then, in step S430, a determination is made whether the one or more blocked participants are the source of the problem. If the one or more blocked participants are the source of the problem, control continues to step S440. Otherwise, control jumps to step s450.

In step S440, one or more of near/far end mute, filtering and/or tuning are selectively applied to one or more of the conference call participants to assist with mitigating the problem, such as noise. In addition to the application of each of these functions, the function such as filter and tune can have their parameters adjusted to assist with fine-tuning that functionality.

In step S450, a determination is made whether another participant should be selected. If another conference call participant should be selected, control jumps back to step S410. Otherwise, control continues to step S460 where the conference continues. Control then continues to step S470 where the control sequence ends.

In accordance with an additional embodiment, one or more of the endpoints could be equipped with a processor and memory (not shown), the memory storing a profile. The profile can be used to store preference information for certain conference call participants, such as tuning and filtering preferences, that could be used for future conference calls. Additionally, one or more of the profile and memory could store instructions that are used for adjusting one or more of a far-end device and functionality at a conference call bridge.

As an example, at some point during a conference call between 3 parties (Pat, Sam and Chris) Pat is experiencing noise from Sam. Pat determines this by using the block functionality. This can be implemented by having Pat's endpoint forward an instruction to one or more of Sam's endpoint and the conference call bridge to mute all communications on Sam's communication channel. The instruction can include information for which of the bridge and endpoint are to implement the blocking functionality as well as an indication of which party is to be blocked. For example, in a SIP environment, this information could be included in a header associated with the instruction.

Having determined that one or more of the communication channel associated with Sam, Sam's endpoint or the environment that Sam is in is the source of the noise, Pat can use one or more of the tune, filter, mute and auto mute functionality described herein. In a similar manner, each of these functions can have an associated instruction that can control the requested function at one or more of another endpoint, a bridge and a plurality of endpoints. These instructions can be provided in an in-band or out-of-band signal. The out-of-band signaling could be through the bridge, with the bridge acting as a proxy, or directly to one or more of the other endpoints. Additionally, voice XML can be used to implement this functionality.

In accordance with yet another exemplary embodiment, the system uses one or more of:

(a) Telecommunication network signaling protocols, to include traditional analog mechanisms, non-IP digital signaling, wireless protocols such as GSM, and VoIP methods such as H.323 and SIP, and the like;

(b) Audio encoding and transmission techniques, including but not limited to Mu-Law and A-Law Pulse Code Modulation, MPEG techniques, Linear Predictive Coding, Code-Excited Linear Prediction, the audio encoding standards recognized by the Global System for Mobile Communications Association (including, but not limited to, GSM, GPRS, EDGE, and 3GSM), and the audio standards recognized by the International Telecommunication Union (including, but not limited to, G.711, G.722, G.723, G.726, G.728, and G.729), and the like; and (c) Video encoding and transmission techniques, including but not limited to the MPEG, AVI, WMA, ITU H.263, and ITU H.264 formats, and the like.

A number of variations and modifications of the invention can be used. It would be possible to provide or claims for some features of the invention without providing or claiming others.

The exemplary systems and methods of this invention have been described in relation to conference call noise reduction. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network, such as a LAN, cable network, and/or the Internet, or within a dedicated system. Thus, it should be appreciated, that the components of the system can be combined in to one or more devices, such as a messaging system, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s), such as a PDA, and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radiowave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A conference call noise identification and reduction system comprising:
    a block module adapted to block audio from one or more conference call participants, the blocking occurring at one or more of a near-end and a conference bridge to allow a conference call participant to identify a source of noise; and
    one or more of a tune module, filter module and mute module selectively operable at the conference bridge for each conference call participant identified by the blocking to reduce the source of noise associated with the conference call participants identified by the blocking, wherein when a first conference call participant selectively operates one or more of the one or more of the tune module, filter module and mute module, the selective operation only affects the audio to the first conference call participant, with the audio to other conference call participants remaining unchanged, and, if the first conference call participant sounds acceptable to a second conference call participant, but does not sound acceptable to a third conference call participant, then the third conference call participant can adjust the first conference call participant to the third conference call participant transmission parameters without affecting the first conference call participant to the second conference call participant transmissions.

2. The system of claim 1, further comprising a status display that displays noise reduction information associated with one or more of the conference call participants.

3. The system of claim 1, further comprising instructions used to control one or more of one or more endpoints and the conference bridge.

4. The system of claim 3, wherein the instructions are sent via one or more of in-band signaling and out-of-band signaling.

5. The system of claim 3, further comprising parameters associated with the instructions.

6. The system of claim 1, wherein one or more of the blocking, tuning, filtering and muting occur during a conference call.

7. The system of claim 1, wherein the system uses one or more of telecommunication network signaling protocols, audio encoding and transmission techniques and video encoding and transmission techniques.

8. The system of claim 1, further comprising one or more profiles that store information about the one or more conference call participants.

9. A conference call noise identification and reduction method comprising:
    blocking audio from one or more conference call participants, the blocking occurring at one or more of a near-end and a conference bridge to allow a conference call participant to identify a source of noise;
    one or more of selectively tuning, filtering and muting at the conference bridge each conference call participant identified by the blocking to reduce the source of noise associated with the conference call participants identified by the blocking, wherein when a first conference call participant selectively operates one or more of the one or more of the tune module, filter module and mute module, the selective operation only affects the audio to the first conference call participant, with the audio to other conference call participants remaining unchanged, and, if the first conference call participant sounds acceptable to a second conference call participant, but does not sound acceptable to a third conference call participant, then the third conference call participant can adjust the first conference call participant to the third conference call participant transmission parameters without affecting the first conference call participant to the second conference call participant transmissions.

10. The method of claim 9, further comprising displaying noise reduction information associated with one or more of the conference call participants.

11. The method of claim 9, further comprising controlling one or more of one or more endpoints and the conference bridge.

12. The method of claim 11, wherein instructions are sent via one or more of in-band signaling and out-of-band signaling.

13. The method of claim 11, further comprising associating parameters with the instructions.

14. The method of claim 9, wherein one or more of the blocking, tuning, filtering and muting occur during a conference call.

15. The method of claim 9, wherein the system uses one or more of telecommunication network signaling protocols, audio encoding and transmission techniques and video encoding and transmission techniques.

16. The method of claim 9, further comprising storing information in one or more profiles about the one or more conference call participants.

17. A non-transitory computer-readable information storage medium having stored thereon instructions, that when executed by a processor, perform the steps of claim 9.

18. The method of claim 10 wherein the selective operation occurs at a mixer.

* * * * *